Jan. 20, 1925. 1,523,511
J. W. BRYCE
SCALE
Filed May 12, 1921 3 Sheets-Sheet 1

Inventor
James W. Bryce
By his Attorneys
Kerr Page Cooper & Hayward

Jan. 20, 1925.

J. W. BRYCE

SCALE

Filed May 12, 1921

Inventor
James W. Bryce
By his Attorneys
Kerr Page Cooper & Hayward

Patented Jan. 20, 1925.

1,523,511

UNITED STATES PATENT OFFICE.

JAMES W. BRYCE, OF BINGHAMTON, NEW YORK, ASSIGNOR, BY MESNE ASSIGNMENTS, TO DAYTON SCALE COMPANY, OF DAYTON, OHIO, A CORPORATION OF NEW JERSEY.

SCALE.

Application filed May 12, 1921. Serial No. 468,833.

*To all whom it may concern:*

Be it known that I, JAMES W. BRYCE, a citizen of the United States of America, residing at Binghamton, in the county of Broome and State of New York, have invented certain new and useful Improvements in Scales, of which the following is a full, clear, and exact description.

This invention relates to improvements in weighing scales and is directed particularly to improvements in load offsetting and weight indicating devices and means for driving and controlling the same.

Other objects of the invention reside in the improvement of the construction shown in my copending application Serial No. 145,132.

Other and more detailed objects of the invention will be set forth in further detail in the accompanying specification and claims and shown in the accompanying drawings which show by way of exemplification a preferred embodiment of the invention.

The scale to which my invention is here shown as applied is of the counter type and comprises a suitable platform 10 pivotally supported upon a base lever 11 and having the usual check 12 to maintain the platform horizontal. The invention, however, is not limited to use in connection with counter scales or with the specific arrangement of platform and base lever here shown. Any suitable connections may be used to the load support.

In carrying out this invention I provide means for utilizing an outside source of power such as a motor for actuating, controlling or setting the load offsetting mechanism. The source of power is also adapted to directly actuate or control the setting of a suitable reading device such as a visual indicator, type wheel or a computing mechanism. Most of these devices require considerable and varying amounts of power for their operation and consequently impose such frictional loads that their use in direct connection with the scale interferes with the accuracy of the weighing.

In the particular embodiment of the invention here illustrated, I employ a yielding device such as a spring which is distended by the power motor to impart an increasing offsetting force to the scale beam parts until the latter are restored to a position of equilibrium suitable controlling means are provided for controlling the operation of the motor and for either increasing or diminishing the amount of offsetting force applied in accordance with loading conditions.

Figure 1:
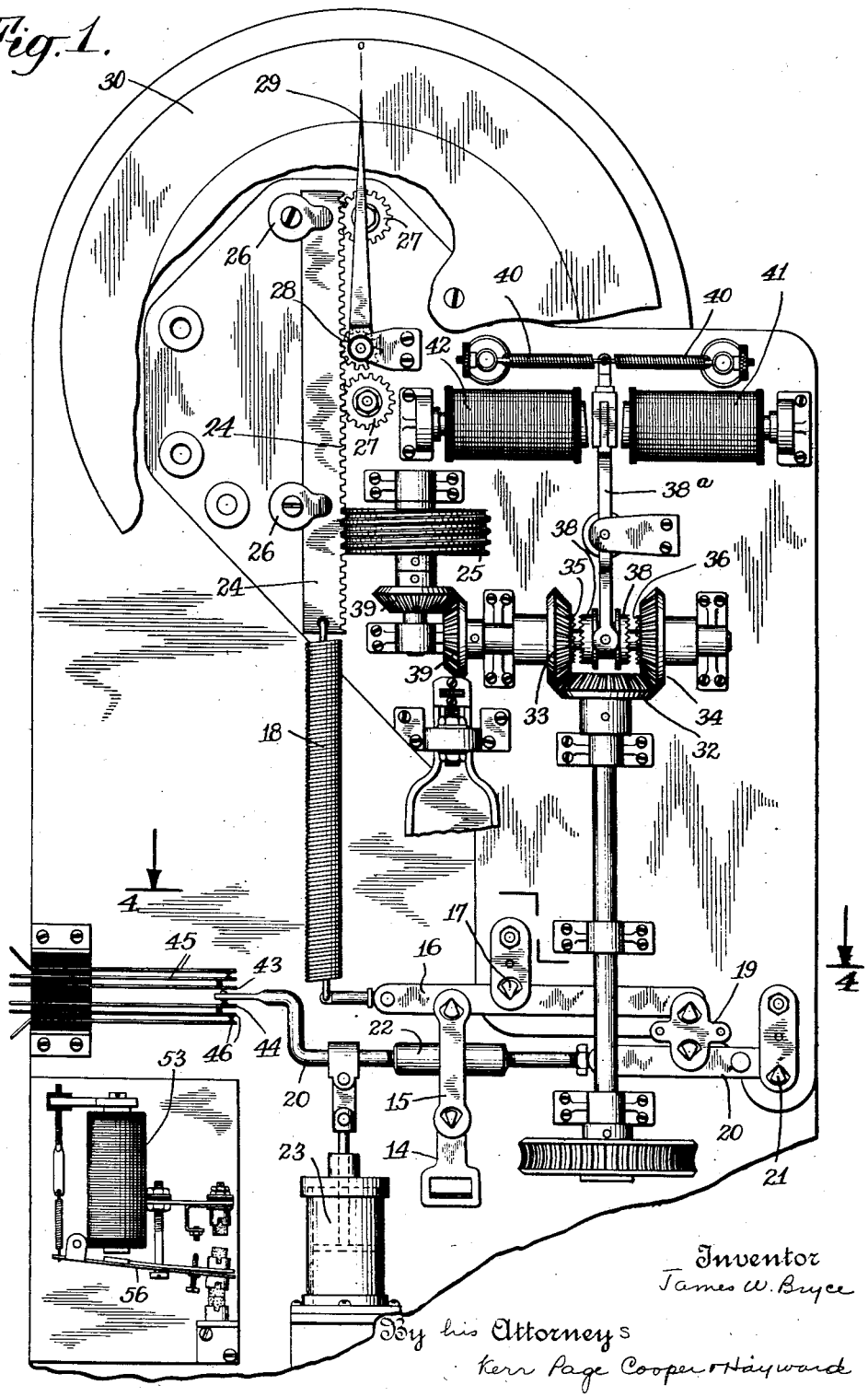
Fig. 1 is a front view of the main operating and controlling parts of the scale with the base lever system removed.
Figure 2:
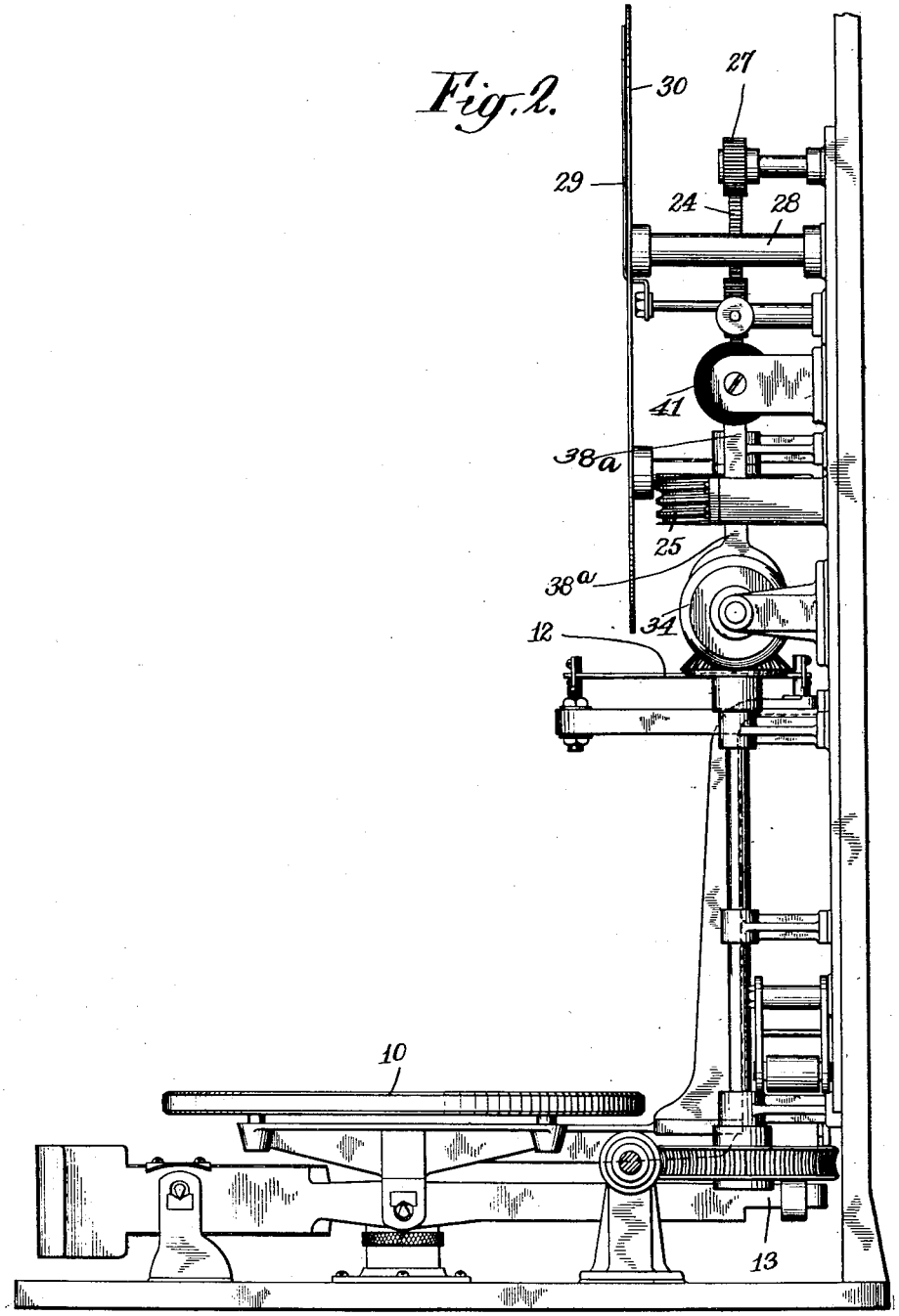
Fig. 2 is a side elevation of the scale.
Figure 3:
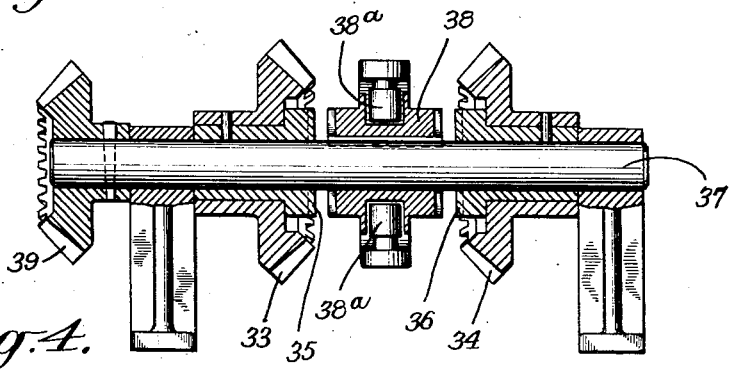
Fig. 3 is a detail sectional view of the clutch mechanism and forward and reverse driving devices.
Figure 4:
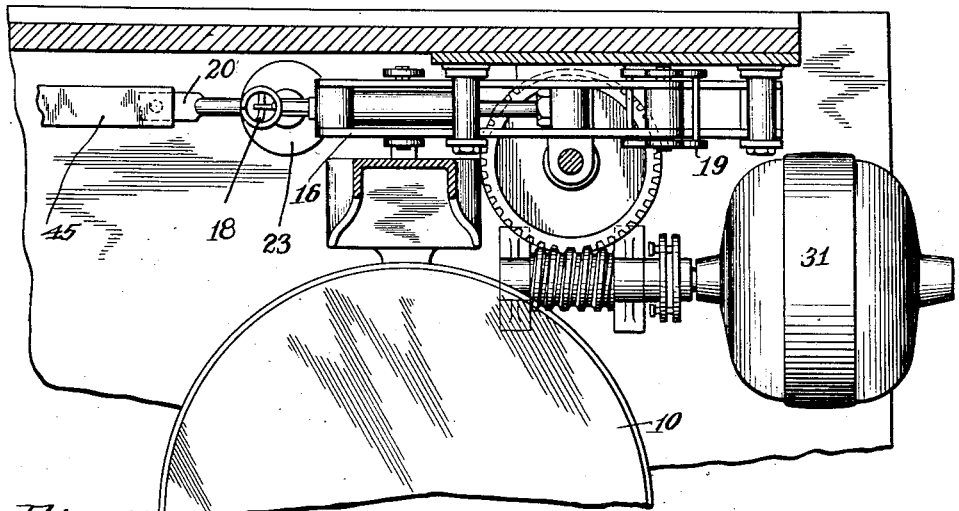
Fig. 4 is a sectional view taken on line 4—4 of Fig. 1.
Figure 5:
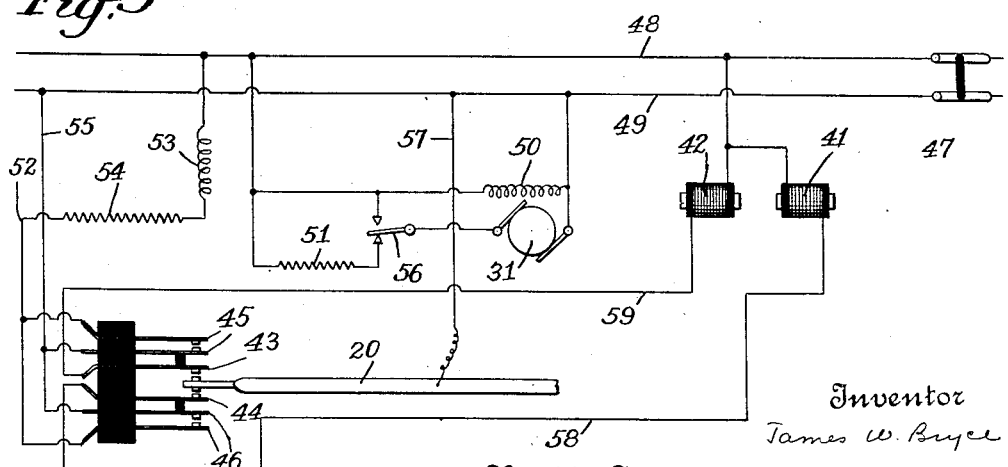
Fig. 5 is a circuit diagram.

Referring to Figs. 1 and 2 of the drawings, the base lever 11 heretofore referred to is adapted to transmit a force proportional to the applied load through its nose portion 13 to a link 14 which in turn transmits the force to a scale beam structure comprised of a lever 16 fulcrumed at 17 and connected by link 19 to a beam 20 fulcrumed at 21. To the first mentioned lever 16, I preferably attach the load offsetting means here shown as yielding means such as spring 18. The beam 20 is preferably of light construction and is extended to the left between the contacts of a contact device which will be hereafter described and also may be provided with a suitable adjustable sealing weight 22 and connected to a suitable dash pot 23 to dampen the oscillations thereof.

I preferably connect the upper end of the spring to a rack 24 which may be lifted or lowered by rotating a worm wheel 25 in proper direction. The rack is suitably guided for vertical movement by stops 26 and idler pinions 27, and also enmeshes with a pinion 28 which drives the reading device, here shown as a pointer 29 sweeping over a dial 30.

To lift or lower the rack 24 and distend or allow the contraction of spring 18 (thereby changing the load offsetting force exerted upon the beam 16), I provide an electric motor 31 which, through suitable gearing and shafting, turns a bevel pinion 32. Pinion 32 concurrently drives bevels 33—34 in opposite directions and these pinions are fixed to clutch members 35—36 which in turn are rotatably mounted upon shaft 37. A complementary double-faced toothed clutch member 38 is splined to the shaft 37 and adapted to be shifted into clutching engagement with either clutch 33 or 34 by means of a forked shifter arm 38ª, whereby the shaft 37 may be rotated forwardly or reversely. The shaft 37, through suitable bevel gearing 39, drives the worm wheel 25. Normally the shifter is retained in mid-position by suitable springs 40 but it may be selectively moved to the left or right to couple the motor with the worm wheel 25 and drive it forwardly or reversely by the energization of magnet 42 or 41.

With the motor rotating the magnet 42 energized the rack will be elevated, the spring distended and increasing increments of load offset are indicated on the dial. With the other magnet 41 energized, the spring will be permitted to shorten and less load will be offset and indicated.

To control the energization of the clutch magnets and to control the speed of rotation of the motor, I provide certain electrical controls which will now be described. Above and below the end of the lever 20 are contact blades 43 and 44. These are slightly spaced from the beam and cooperate therewith to close the clutch magnet circuits upon the upper end of the lever. Above and below these blades are other pairs of contacts 45 and 46, which control the slow or fast running of the motor.

If a weighing is to be made a suitable switch 47 is first closed to connect lines 48—49 to a source of power. The motor rotates at a slow speed, the shunt field 50 being directly across the line and the armature circuit having included therein a controlling resistance 51. If a comparatively heavy load is placed upon the scale, the spring 18 will distend sufficiently to permit lever 20 to raise into contact with blade 43 and therethrough close contacts 45. Current will now flow from line 48 through a circuit 52, which includes relay magnet 53, controlling resistance 54 and back through a common return 55 to the line 49. The energization of relay magnet 53 picks up a relay arm 56 and cuts out the resistance 51, allowing the motor to rotate at a comparatively high rate of speed.

Concurrently with the foregoing operation current flows from line 49 through wire 57 to beam 20, thence through blade contact 43 and wire 58, through the forward clutch magnet 42 and back to line 48.

The motor now elevates the rack extending a constantly increasing load offsetting force to the scale beam until eventually beam 20 moves to a sufficient extent to permit contacts 45 to open. Relay 53 is again de-energized, cutting down the speed of the motor, which, however, continues to rotate until the beam 20 is brought back to a free floating position between the blades 43—44. Clutch magnet 42 is then de-energized stopping further change in the position of the rack 24. The pointer 29 will then indicate the offset load, since the force exerted by the spring upon the lever system must equalize the applied load before the beam 20 will float clear of the contact blades.

If any or all of the load be removed from the scale, the load offsetting means will overbalance the beam system 16—20, causing lower contacts 44—46 to be closed. Closure of contacts 46 will cut the resistance 51 out of circuit and allow the motor to rotate rapidly. The beam 20 being in contact with 44, will allow current to flow from the line, through a circuit 58 to the clutch magnet 41, whereby the reverse clutch is engaged, causing the motor to drive rack 24 downwardly. The lowering of the rack continues, the speed circuit for the motor being interrupted at the proper time, and when the parts have again re-established equilibrium the clutch magnet 41 is de-energized, bringing the rack and indicator to rest.

For very light applied loads or slight changes in load, it may happen that the contacts 45 and 46 will not be closed. This is desirable since otherwise the motor, if running at a high speed, might cause the rack to over-travel and necessitate a readjustment in the opposite direction before the parts would come to a final position of rest.

For normal operations the rapid and slow operating effects are desirable since the weighing operation can be carried out much more expeditiously and at the same time the final adjustment of the offsetting force may be made slowly enough to secure accuracy and avoid the necessity of the device having to reverse and lower the rack a short distance.

What I claim is:

1. A weighing scale comprising a scale beam, a yielding load offsetting means, a motor for actuating said means, means controlled by the load upon the beam for connecting the motor to said means, and means controlled by the load for automatically disconnecting the motor from the load offsetting means.

2. A weighing scale comprising a scale beam structure, a load offsetting means therefor, a driving motor, clutches and forward and reverse driving connections intermediate the motor and the load offsetting means, and means controlled by the applied load for selectively controlling the operation of said clutches.

3. A weighing scale comprising a scale beam structure, a load offsetting mechanism therefor, a driving motor, clutch means and forward and reverse driving connections intermediate the motor and said means, and contact devices actuated by the scale beam structure for selectively controlling the engagement of the clutch means and thereby actuating the load offsetting means forwardly or reversely in accordance with the relation of the applied and offset load.

4. In a weighing scale in combination a scale beam, a load offsetting means therefor, an indicator, a motor, means controlled by the beam for coupling the motor to said load offsetting means and indicator to actuate the said indicator and means and increase the offsetting force upon the beam until it is restored to balance, and means controlled by the beam for differently coupling the motor to the load offsetting means when the load is removed from the beam whereby the offsetting force upon the beam may be decreased and the beam restored to balance.

5. In a weighing scale, in combination, a scale beam having a connected load support, a power actuated yielding load offsetting means therefor, and means for effecting a rapid power operation of said means until the applied load is approximately offset and means for thereafter effecting a slow power operation as the parts approach their final position.

6. In a weighing scale in combination a scale beam, having a connected load support, a yielding load offsetting means therefor, a motor for driving the said means, and contact devices controlled by said beam for effecting coupling and uncoupling of the motor and the load offsetting means.

7. In a weighing scale, in combination with a scale beam, having a connected load support, yielding means for restoring the position of the beam upon the application of a load, said means comprising an electric driving motor, and means for controlling driving of the same at a rapid rate for approximately restoring the beam and means for thereafter controlling the driving of the same at a lower rate of speed as the beam approaches its final position.

8. In a weighing scale, in combination with a scale beam, a load offsetting means connected thereto, means for actuating the same by a source of power independent of the gravity of the load, and clutch means for selectively controlling the direction of drive by the aforesaid means, whereby the load offsetting means is actuated in one direction upon the application of overbalancing loads to the beam and whereby the load offsetting means is operated in reverse direction by the motor upon the applied load being less than the offset load.

9. In a weighing scale comprising, in combination with a scale beam, a yielding load offsetting means therefor, actuating means therefor comprising a power motor operated by energy independent of the gravity of the load, means for selecting the direction of actuation and for coupling and uncoupling the motor to the load offsetting means, and means controlled by the pull of the load or the load offsetting force for selecting the direction of drive and the coupling and uncoupling of the motor and load offsetting means.

10. The invention set forth in claim 9 in which an indicator is provided and which operating connections are provided from the power motor for displacing the indicator in accordance with the applied load.

11. A weighing scale, comprising in combination, a scale beam structure, a yielding means connected thereto, an indicator, a driving motor means, means controlled by the applied load for coupling the motor and said yielding means when the applied load overbalances the beam structure, and means controlled by the beam structure for uncoupling the motor and said yielding means when the beam has been restored to its balancing position by the yielding means.

12. The invention set forth in claim 11 in which contact devices are provided controlled by the beam structure for establishing circuits to the motor to cause rapid initial rotation and slower final rotation thereof.

13. A weighing scale comprising a scale beam structure, a yielding load offsetting means connected thereto, a motor, means for coupling the motor to the yielding means to distend the latter upon the application of an overbalancing load to the scale beam structure, and for uncoupling the motor and yielding means when balance is reestablished, and means for differently coupling the motor to the yielding means to permit the shortening of the latter upon the removal of load from the beam structure and for uncoupling the motor upon the restoration of balance of the beam structure.

14. A weighing scale comprising a scale beam structure, a load offsetting means adapted when operated to apply an increasing counter-force to the beam structure in opposition to the gravity pull thereon, an electric motor for operating the aforesaid means, means for coupling and uncoupling the said means and motor, and control devices therefor having provisions for automatically effecting the coupling when the applied load overbalances the beam and for effecting an uncoupling when the applied load is balanced by the forces exerted by the load offsetting means.

15. The invention set forth in claim 14 in which a second coupling device is provided which when operated is adapted to actuate the load offsetting means in reverse direction and diminish the force exerted thereby upon the beam.

In testimony whereof I hereto affix my signature.

JAMES W. BRYCE.